Patented Apr. 7, 1953

2,634,241

UNITED STATES PATENT OFFICE 2,634,241

PURIFYING SILICA-ALUMINA GEL OF MANGANESE

Glenn M. Webb, Western Springs, Ill., assignor to Standard Oil Company, Chicago, Ill., a corporation of Indiana No Drawing. Application December 29, 1950, Serial No. 203,524

4 Claims. (Cl. 252—455)

This invention relates to the purification of silica-alumina gels. More particularly, it relates to the removal of metallic contaminants from silica-alumina gels and to the preparation of silica-alumina catalysts in purified form.

Silica-alumina in various forms is used in large quantities as a catalyst for the conversion of hydrocarbons, especially for the cracking of higher-boiling aliphatic hydrocarbons into lower-boiling hydrocarbons. In all of its catalytic applications, the purity of the silica-alumina is an important factor in determining its physical and chemical characteristics. The presence of inorganic salts therein causes the catalyst to have low crushing strength, poor resistance to attrition, and other undesirable mechanical properties. The presence of various metals and/or metallic ions, other than specific promoters which may be intentionally incorporated therein, leads to undesirable side reactions and to changes in the mechanical and chemical structure of the completed catalyst. For these reasons the chemical art has long sought to prepare silica-alumina gel and catalysts based thereon in highly purified form, or to treat such materials to remove impurities therefrom.

One of the more objectionable impurities in catalysts for converting hydrocarbons is manganese, owing to the fact that manganese in proportions as low as around 0.02 percent by weight tends to produce uncontrolled cracking and severe deposition of carbon in the form of coke on the catalyst. Manganese is commonly found in substantial proportions in the raw materials from which silica-alumina is made. For example, it is found in blast-furnace slag, from which silica-alumina cracking catalyst is conveniently prepared by the d'Ouville technique, described in U. S. Patent 2,288,875, which issued on July 7, 1942. The resulting "slag gel" catalyst ordinarily contains around 0.1 to 0.2 percent by weight of manganese, a highly deleterious proportion, and no method for the removal of this contaminant has heretofore been taught in the prior art.

I have now discovered that manganese and various other contaminating metals can be removed from silica-alumina gels and from solids comprised thereof by contacting the said materials with an aqueous solution of a water-soluble aluminum salt, such as aluminum chloride. During this treatment, the manganese is interchanged with aluminum, and is dissolved by the aluminum salt solution, with which it is withdrawn. The solid is thereby rendered substantially free from manganese, and the proportion of other contaminating metals therein is greatly reduced; and I have found that catalysts of superior properties can be prepared therefrom.

One object of my invention is to prepare a substantially pure silica-alumina gel. Another object is to remove metal contaminants from silica-alumina gel. A further object is to prepare a substantially manganese-free silica-alumina gel.

A still further object is to prepare substantially manganese-free compositions comprising silica-alumina. A subsidiary object is to prepare silica-alumina catalysts having superior mechanical and catalytic properties. Other objects of my invention are set forth explicitly and impliedly in the present description and in the attached claims.

My invention is applicable to the treatment of any type of silica-alumina gel, hydrogel, ultragel, aerogel, xerogel, precipitated gel, or the like with or without a preliminary washing to remove soluble salts therefrom, with or without a preliminary drying operation, and with or without a preliminary calcining at elevated temperature. I prefer to treat fresh materials, unused in catalytic processes, since I have discovered that silica-alumina gels tend to undergo changes, when used in the conversion of hydrocarbons, which greatly reduce the rate at which the desired purification takes place.

In carrying out my new process, I commingle a silica-alumina gel or a solid composition comprised thereof with an aqueous solution of an aluminum salt, such as the chloride, bromide, nitrate, sulfate, acetate, or the like, at autogenous pressure and at ordinary or elevated temperature, preferably between about 50 and 150° F., until the desired exchange has taken place, from one to ten hours being ordinarily sufficient. The aluminum salt solution may be dilute, concentrated, or saturated, but I prefer a salt concentration between about 10 and 25 percent by weight. A sufficient quantity of the aluminum salt solution should be used to contact the impurities in the silica-alumina gel with at least a stoichiometric quantity of aluminum salt, and preferably with a 50 to 100 percent excess. The solution is thereafter separated from the treated gel by filtration, centrifugation, settling and decantation, or the like, and the gel is further processed according to conventional procedures. It is ordinarily washed with water or with an aqueous solution of a weak organic acid to remove soluble salts therefrom. Optionally at this point various catalytic materials may be added thereto, such as ceria, chromia, molybdena, or the like, in the form of finely divided solids or preferably as hydrous gels. Finally, the gel or mixed gels are dried and optionally calcined at elevated temperature. The catalyst may be shaped by pelleting, extruding, or otherwise modifying the form thereof at an appropriate point during its preparation, in accordance with the intended application.

My invention is especially well suited for purifying synthetic silica-alumina catalysts prepared from blast-furnace slag according to the procedure of Edmond L. d'Ouville, referred to above. According to the d'Ouville technique, a blast-furnace slag from, for example, the smelting of hematite ores is comminuted to about 100 mesh and is slurred at around 230° F. with hydrochloric acid containing about 15 to 20 percent by weight HCl, one part by weight of slag being added to five parts of the acid. As soon as the slag has disintegrated and the formation of hydrosol is complete, any undissolved materials are removed by filtration, centrifugation, or the like, and the clarified hydrosol is allowed or induced to coagulate, suitably by being sprayed into an atmosphere of ammonia. The resulting gel is washed thoroughly with water to remove excess acid and soluble salts. A typical analysis of the gel is as follows, dry basis:

| Component | Proportion, wt. percent |
|---|---|
| Alumina | 18.5 |
| Manganese | 0.12 |
| Magnesium | 1.25 |
| Calcium | 1.0 |
| Titanium | 1.0 |
| Iron | 0.21 |
| Nickel | 0.0035 |
| Sodium | 0.04 |
| Copper | 0.0007 |

The hydrous gel is then purified according to my invention by treatment with an aqueous aluminum salt solution (for example, aqueous 10 percent aluminum sulfate) at 150° F. for one hour to remove substantially all of the manganese and the greater part of the other contaminating metals therefrom. The mass is again washed to remove occluded aluminum salt, and is dried and crushed to the desired size, or pelleted or extruded as required in the use for which it is intended. Finally, it is calcined at about 1000° F., whereby it is dehydrated, stabilized, and mechanically strengthened.

The following specific example illustrates a practical embodiment of my invention:

Example

A synthetic microspherical silica-alumina catalyst of the slag-gel type was prepared by digesting blast-furnace slag in hydrochloric acid, centrifuging the resulting hydrosol to remove undissolved solids, spraying the clarified hydrosol into a tower filled with gaseous ammonia, washing the resulting microspheres to remove excess acid and soluble salts, drying, and calcining.

A 100-gram sample of the resulting microspheres was digested four hours at 150° F. in 400 grams of an aqueous solution containing 10 percent by weight of pure aluminum chloride.

The original and the treated catalysts were analyzed and subjected to tests according to the procedure of Shankland and Schmitkons ("Determination of Activity and Selectivity of Cracking Catalysts," Proceedings of the American Petroleum Institute, Twenty-Seventh Annual Meeting, volume 27 (III), pages 57-77 (1947)), with the following results:

| | Original Catalyst, wt. percent | Treated Catalyst, wt. percent |
|---|---|---|
| Alumina | 18.5 | 18.7 |
| Manganese | 0.07 | 0.006 |
| Magnesium | 0.9 | 0.04 |
| Calcium | 0.71 | 0.00 |
| Titanium | 0.65 | 0.15 |
| Iron | 0.095 | 0.09 |
| Nickel | 0.002 | 0.01 |
| Sodium | 0.02 | 0.00 |
| Copper | 0.00015 | 0.002 |
| Activity, IRA | 205 | 192 |
| Coke factor, $C_F$ | 1.28 | 1.09 |
| Gas factor, $G_F$ | 0.93 | 0.83 |

From the above table it will be seen that the manganese and the other major impurities were removed from the catalyst by treatment according to my invention, while simultaneously the coke and gas factors were improved.

My purified silica-alumina gel and combinations thereof with other catalytic materials are especially useful in the conversion of hydrocarbons, owing to the fact that they are substantially free from manganese, which I have observed to be objectionably active in the formation of coke. Among the hydrocarbon-conversion processes for which my purified gel is an excellent catalyst or catalyst base are the cracking of hydrocarbons, viscosity breaking of heavy oils, reforming gasoline and naphthas, hydroforming of naphthenes, dehydrogenation of naphthas, gas reversion, and the like.

While I have described my invention with reference to a specific embodiment thereof in the above example, it is to be understood that I am not limited thereto, but have clearly pointed out and defined the broad scope thereof elsewhere in the description and in the claims. In general, it can be said that any modifications or equivalents that would ordinarily occur to one skilled in the art are to be considered as lying within the scope of my invention.

In accordance with the foregoing description, I claim as my invention:

1. A process for purifying a manganese-contaminated silica-alumina gel which comprises contacting said silica-alumina gel with an aqueous solution of an aluminum salt for a sufficient time to effect base-exchange between said manganese and said aluminum salt, whereby aluminum replaces said manganese in said silica-alumina and said manganese is dissolved in said solution, and withdrawing said solution, leaving said silica-alumina gel substantially free from manganese.

2. A process for purifying a manganese-contaminated silica-alumina gel catalyst which comprises contacting said catalyst with an aqueous solution of an aluminum salt for a sufficient time to effect base-exchange between said manganese and said aluminum salt, whereby aluminum replaces said manganese in said silica-alumina and said manganese is dissolved in said solution, and withdrawing said solution, leaving said catalyst substantially free from manganese.

3. A process for purifying manganese-contaminated synthetic silica-alumina which comprises contacting said synthetic silica-alumina with an aqueous solution of an aluminum salt for a sufficient time to effect base-exchange between said manganese and said aluminum salt, whereby aluminum replaces said manganese in said silica-alumina and said manganese is dissolved in said solution, and withdrawing said solution, leaving said synthetic silica-alumina substantially free from manganese.

4. A process for purifying a metal-contaminated silica-alumina gel containing manganese as one of said metal contaminants, which comprises contacting said silica-alumina gel with an aqueous solution of an aluminum salt at a temperature between about 50 and 150° F. for between one and ten hours, whereby base-exchange is effected between said aluminum salt and said contaminating metals, the proportion of contaminating metals in said silica-alumina gel being substantially reduced and said contaminating metals being dissolved in said solution, and withdrawing said solution, leaving a purified silica-alumina gel.

GLENN M. WEBB.

REFERENCES CITED

The following references are of record in the file of this patent:

UNITED STATES PATENTS

| Number | Name | Date |
|---|---|---|
| 1,193,795 | Kolb | Aug. 8, 1916 |
| 2,414,736 | Gray | Jan. 21, 1947 |
| 2,474,440 | Smith et al. | June 28, 1949 |
| 2,480,628 | Bodkin | Aug. 30, 1949 |